United States Patent
Lee et al.

(10) Patent No.: US 12,106,076 B2
(45) Date of Patent: Oct. 1, 2024

(54) METHOD FOR GENERATING PROGRAM FOR USE IN ACCELERATOR FOR DEEP LEARNING

(71) Applicant: MOREH CORP., Seoul (KR)

(72) Inventors: Jaejin Lee, Seoul (KR); Wookeun Jung, Seoul (KR)

(73) Assignee: MOREH CORP., Seoul (KR)

( * ) Notice: Subject to any disclaimer, the term of this patent is extended or adjusted under 35 U.S.C. 154(b) by 182 days.

(21) Appl. No.: 17/853,090

(22) Filed: Jun. 29, 2022

(65) Prior Publication Data

US 2022/0326915 A1 Oct. 13, 2022

Related U.S. Application Data

(63) Continuation of application No. PCT/KR2020/095164, filed on Dec. 29, 2020.

(30) Foreign Application Priority Data

Dec. 30, 2019 (KR) .................. 10-2019-0177775
Dec. 16, 2020 (KR) .................. 10-2020-0176318

(51) Int. Cl.
*G06F 9/44* (2018.01)
*G06F 8/33* (2018.01)
*G06N 20/00* (2019.01)

(52) U.S. Cl.
CPC .............. *G06F 8/33* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,972,063 B2* | 5/2018 | Ashari | G06T 1/20 |
| 11,144,290 B2* | 10/2021 | Azimi | G06F 8/4441 |
| 2007/0174828 A1* | 7/2007 | O'Brien | G06F 8/45 |
| | | | 717/151 |
| 2011/0276962 A1* | 11/2011 | Chambers | G06F 21/577 |
| | | | 718/1 |
| 2015/0089484 A1* | 3/2015 | Halambi | G06F 8/447 |
| | | | 717/148 |
| 2017/0249716 A1 | 8/2017 | Meixner et al. | |
| 2019/0114534 A1* | 4/2019 | Teng | G06N 3/04 |
| 2020/0249918 A1* | 8/2020 | Svyatkovskiy | G06N 3/084 |
| 2021/0103433 A1* | 4/2021 | Kerr | G06N 3/045 |

FOREIGN PATENT DOCUMENTS

| | | |
|---|---|---|
| JP | 6547466 B2 | 7/2019 |
| KR | 10-2018-0065830 A | 6/2018 |
| KR | 10-2018-0100372 | 9/2018 |
| KR | 10-2018-0122019 A | 11/2018 |
| WO | 2019/079008 A1 | 4/2019 |

* cited by examiner

*Primary Examiner* — Wei Y Zhen
*Assistant Examiner* — Lanny N Ung
(74) *Attorney, Agent, or Firm* — Banner & Witcoff, Ltd.

(57) ABSTRACT

The present disclosure relates to a method for generating a program for use in an accelerator for deep learning. The method may include receiving, by a computing device, a deep learning application, generating an element-wise operation list included in the deep learning application, generating an intermediate expression from the element-wise operation list, and generating, based on the intermediate expression, a program for use in an accelerator for the deep learning application.

20 Claims, 10 Drawing Sheets

METHOD FOR GENERATING PROGRAM FOR USE IN ACCELERATOR FOR DEEP LEARNING

CROSS-REFERENCE TO RELATED APPLICATION

The present application is a continuation of International Patent Application No. PCT/KR2020/095164, filed on Dec. 29, 2020, which is based upon and claims the benefit of priority to Korean Patent Application No. 10-2019-0177775, filed on Dec. 30, 2019 and Korean Patent Application No. 10-2020-0176318, filed on Dec. 16, 2020. The disclosures of the above-listed applications are hereby incorporated by reference herein in their entirety.

TECHNICAL FIELD

The present disclosure relates to a method for generating a program for use in an accelerator for deep learning. Specifically, one or more examples of the disclosure relate to a method for generating an optimal program for use in an accelerator for deep learning by combining element-wise operations included in a deep learning application.

BACKGROUND

Application programmers who write deep learning applications generally use deep learning frameworks (e.g., TensorFlow) to express combinations of element-wise operations, and the deep learning frameworks can be executed by mapping the operations specified by the application programmer to a pre-implemented individual program for element-wise operation. A pre-implemented individual program for element-wise operation can be implemented by using a primitive library (e.g., Nvidia's cuDNN, Intel's MKL-DNN) generally distributed by a hardware manufacturer, and the source code of the program is not usually disclosed.

When processing a combination of element-wise operations, performance improvement can be achieved by implementing and processing the combination of element-wise operations as a single program rather than executing each element-wise operation as separate programs. For example, when two element-wise operations A and B are sequentially executed and the operation result of A is used as an input to B, by writing a program that processes A and B at once, the overhead of storing the result of A in memory and reading it in B can be eliminated. Such a technique is referred to as kernel fusion.

Researches/inventions/programs to accelerate deep learning applications by using kernel fusion have already been developed, but there is a limitation in that kernel fusion can be executed only for a predetermined pattern. That is, according to the related art, for an element-wise operation pattern that is not defined in advance, a program combining element-wise operations may not be generated.

SUMMARY

In order to address one or more problems (e.g., the problems described above and/or other problems not explicitly described herein), the present disclosure provides a method for generating a program for use in an accelerator for deep learning and a non-transitory computer-readable recording medium storing instructions.

The present disclosure may be implemented in various ways, including a method, an apparatus, a computer program stored in a computer-readable storage medium, or a non-transitory computer-readable recording medium storing instructions.

A method for generating a program for use in an accelerator for deep learning may include receiving a deep learning application, generating an element-wise operation list included in the deep learning application, generating an intermediate expression from the element-wise operation list, and generating a program for use in an accelerator for the deep learning application based on the intermediate expression.

The method may further include analyzing, by an element-wise operation division scheduler, the deep learning application to extract a plurality of element-wise operations included in the deep learning application. The generating an element-wise operation list included in the deep learning application may include generating an element-wise operation list including the plurality of extracted element-wise operations.

The method may further include analyzing a pattern of the extracted plurality of element-wise operations to determine a data dependency relationship of the plurality of element-wise operations, and determining a plurality of division schedules corresponding to the deep learning application based on the determined data dependency relationship of the plurality of element-wise operations.

The method may further include selecting, by the element-wise operation division scheduler, one division schedule from among the plurality of division schedules. The generating an intermediate expression from the element-wise operation list may include extracting a plurality of element-wise operation intermediate expressions corresponding to the element-wise operation list from an intermediate expression DB based on the selected one division schedule, in which each of the plurality of element-wise operation intermediate expressions may represent a data flow graph for an operation of one thread block, and generating one or more intermediate expressions by concatenating the extracted plurality of element-wise operation intermediate expressions based on the selected one division schedule.

The generating a program for use in an accelerator for the deep learning application based on the intermediate expression may include generating a program for use in the accelerator corresponding to each of the one or more intermediate expressions generated based on the selected one division schedule.

The method may further include determining a performance of the generated program for use in the accelerator, providing the determined performance of the program for use in the accelerator to the element-wise operation division scheduler, and selecting, by the element-wise operation division scheduler, one division schedule other than the selected division schedule from among the plurality of division schedules based on the determined performance of the program for use in the accelerator.

The method may further include generating a plurality of programs for use in the accelerator corresponding to the plurality of determined division schedules, and determining a performance of each of the plurality of programs for use in the accelerator. The generating a program for use in an accelerator for the deep learning application based on the intermediate expression may include selecting one program for use in the accelerator from among the plurality of generated programs for use in the accelerator based on the determined performance.

The intermediate expression may be represented by a graph including a plurality of nodes representing each scalar operation and edges representing a dependency relationship between the scalar operations. The generating a program for use in an accelerator for the deep learning application based on the intermediate expression may include searching a graph of the intermediate expression by reverse postorder to generate a core operation code corresponding to an operation of each node.

The generating a program for use in an accelerator for the deep learning application based on the intermediate expression may include acquiring hardware and a target programming language used in the deep learning application, extracting a basic code corresponding to the acquired hardware and target programming language from a previously stored basic code DB, and generating a program for use in the accelerator including the extracted basic code and the generated core operation code.

There is provided a non-transitory computer-readable recording medium storing instructions for executing, on a computer, the method for generating a program for use in an accelerator for deep learning described above.

According to some examples of the present disclosure, the processor may generate in real time a program for use in an accelerator corresponding to the combination of element-wise operations that can exhibit optimal performance based on element-wise operations included in the deep learning application, to thus reduce overhead, and the like and improve the performance of the deep learning application.

According to some examples of the present disclosure, for the deep learning application including any element-wise operation and/or combination of element-wise operations, the processor may generate a program for use in the accelerator by combining the element-wise operations forming the deep learning application, and may generate and/or select a program for use in the accelerator having an optimal performance, based on the performance of each program for use in the accelerator according to the division schedule.

According to some examples of the present disclosure, the processor may generate a program for use in the accelerator by combining one or more element-wise operations in real time and without the intervention of a programmer, such that it is possible to automate a series of processes for generating an optimal program for use in the accelerator. That is, it is possible to generate a code for the deep learning application or enhance the performance of the existing deep learning application without the need for additional human resources.

According to some examples of the present disclosure, the processor may appropriately concatenate one or more element-wise operation intermediate expressions according to the division schedule to generate an optimal intermediate expression.

According to some examples of the present disclosure, the processor may generate a code corresponding to the intermediate expression in real time to generate a program for use in an accelerator.

According to some examples of the present disclosure, the final program for use in the accelerator with the best performance among the programs for use in the accelerator according to the division schedules may be generated, and the generated final program for use in the accelerator may be used to drive the deep learning application.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
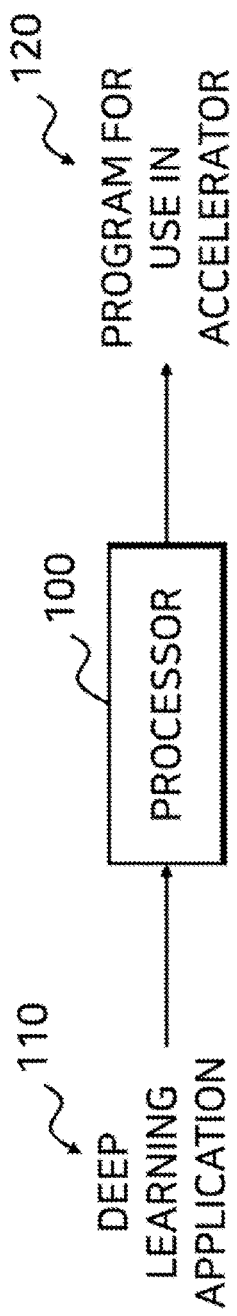
FIG. 1 is a diagram illustrating an example in which a processor generates a program for use in an accelerator.

Hereinafter, examples details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of various examples, duplicate descriptions of the same or corresponding components may be omitted. However, even if descriptions of components are omitted, it is not intended that such components are not included in any embodiment.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed embodiment(s) in detail. The terms used herein have been selected as general terms which are widely used at present in consideration of the functions of the present disclosure, and this may be altered according to the intent of an operator skilled in the art, conventional practice, or introduction of new technology. In addition, in specific cases, certain terms may be arbitrarily selected by the applicant, and the meaning of the terms will be described in detail in a corresponding description of the embodiment(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, or an accelerator such as a multi-core CPU, a GPU, a FPGA, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, the "deep neural network (DNN) framework" or "deep learning framework" may include any set of software created to facilitate writing and executing a deep learning application. Such a DNN framework can accelerate a training process and an inference process by applying a deep learning processing or deep learning operation function to an accelerator so that developers can more easily use parallel programming models or programs that require high proficiency. For example, the DNN framework may include DNN frameworks such as Caffe, Tensorflow, Pytorch, CNTK, Theano, and the like, which have been widely used recently, but is not limited thereto.

In the present disclosure, the "deep learning application" may refer to a combination of a plurality of element-wise operations. A deep learning application programmer can use a deep learning framework (e.g., Tensorflow, Pytorch, CNTK, Caffe, and the like) to write a combination of a plurality of element-wise operations, thereby generating a deep learning application.

In the present disclosure, the "element-wise operation" may refer to any scalar operation and/or a set of scalar operations forming a deep learning application, but is not limited thereto, and may include operations such as an addition operation, a subtraction operation, a maximum value operation, a minimum value operation, a floating-point multiplication operation, a convolution operation, matrix multiplication, Recitified Linear Unit (ReLU), pooling, Long Short-Term Memory (LSTM), Gated Recurrent Unit (GRU), and the like, for example.

In the present disclosure, the "element-wise operation intermediate expression" may refer to a data flow graph (hereinafter, DFS) that expresses the operation of one thread block. For example, the element-wise operation intermediate expression may be expressed as a graph including a plurality of nodes representing a scalar operation and edges representing the dependency relationship between the scalar operations.

In the present disclosure, the "intermediate expression" may refer to a combination of one or more element-wise operation intermediate expressions generated based on the data dependency relationship, and may be represented by DFS, for example.

In the present disclosure, the "division schedule" may refer to a schedule for how to implement a program for use in an accelerator by analyzing the pattern of element-wise operations included in the deep learning application, and one or more division schedules or a plurality of division schedules may be determined based on element-wise operations included in the deep learning application, an execution order of the element-wise operations, dependency relationships among the element-wise operations, and the like.

In the present disclosure, a "core operation code" may refer to a code forming at least a part of a program for use in an accelerator, and for example, may refer to a code representing the intermediate expression. If the accelerator is used as a GPU and a CUDA program is used as a target of the GPU, the core operation code may refer to an operation part in the middle of the kernel of the program for use in the accelerator.

In the present disclosure, the "program for use in an accelerator" refers to any code and/or executable file and the like that can operate on the accelerator, and may include a C program, OpenCL, CUDA program, and the like.

In the present disclosure, the "code" may refer to any code written to execute a program, and may refer to source code or the like, for example.

FIG. 1 is a diagram illustrating an example in which a processor 100 generates a program 120 for use in an accelerator. For example, the program for use in the accelerator 120 represents any code and/or executable file and the like that can be operated on the accelerator, and may include a program and the like that can be operated on a multi-core CPU, GPU, FPGA, or the like. In addition, the program for use in the accelerator 120 may refer to any program generated by combining/concatenating one or more element-wise operations. In this example, the element-wise operation may refer to any operation that can be used in deep learning, and may include operations such as convolution, matrix multiplication, Recitified Linear Unit (ReLU), pooling, LSTM (Long Short-Term Memory), Gated Recurrent Unit (GRU), and the like, for example.

The processor 100 may receive a deep learning application 110. In this example, the deep learning application 110 may refer to any software program, or information and/or data for generating any software program configured or expressed by a combination of element-wise operations. For example, the deep learning application 110 may be generated by arbitrarily combining or concatenating element-wise operations such as convolution, matrix multiplication, ReLU, pooling, LSTM, GRU, and the like described above. The processor 100 may extract element-wise operations included in the deep learning application 110 from the received deep learning application 110 and generate an element-wise operation list including the extracted element-wise operations. In this case, the element-wise operation list may include each element-wise operation included in the deep learning application 110, an execution order of each element-wise operation, a dependency relationship of each element-wise operation, and the like.

The processor 100 may generate an intermediate expression from the element-wise operation list. For example, the intermediate expression is for generating the code underlying the program for use in the accelerator 120, and may be generated by using the element-wise operation intermediate expression. In this case, the element-wise operation intermediate expression may refer to a data flow graph (DFG) of the element-wise operation. For example, the data flow graph may include a node representing a scalar operation, an edge representing a data dependency relationship between the scalar operation, and the like. Accordingly, the intermediate expression may refer to a data flow graph generated by combining the data flow graphs of these element-wise operations. The processor 100 may receive one or more element-wise operation intermediate expressions from an intermediate expression database (DB). For example, the processor 100 may generate the intermediate expression by concatenating one or more element-wise operation intermediate expressions, performing optimization of shared memory, and distributing operations among threads.

The processor 100 may generate the program 120 for use in the accelerator for the deep learning application 110 based on the intermediate expression. The processor 100 may generate the code for the program 120 for use in the accelerator based on the intermediate expression. In this case, the processor 100 may generate and/or determine one program 120 for use in an accelerator or generate and/or determine two or more programs 120 for use in an accelerator according to a combination of element-wise operations exhibiting optimal performance. With such a configuration, the processor 100 may generate a program for use in an accelerator corresponding to the combination of element-wise operations that can exhibit optimal performance based on element-wise operations included in the deep learning application, to thus reduce overhead, and the like and improve the performance of the deep learning application. For example, the processor 100 may generate such a program for use in the accelerator in real time.

Figure 2:
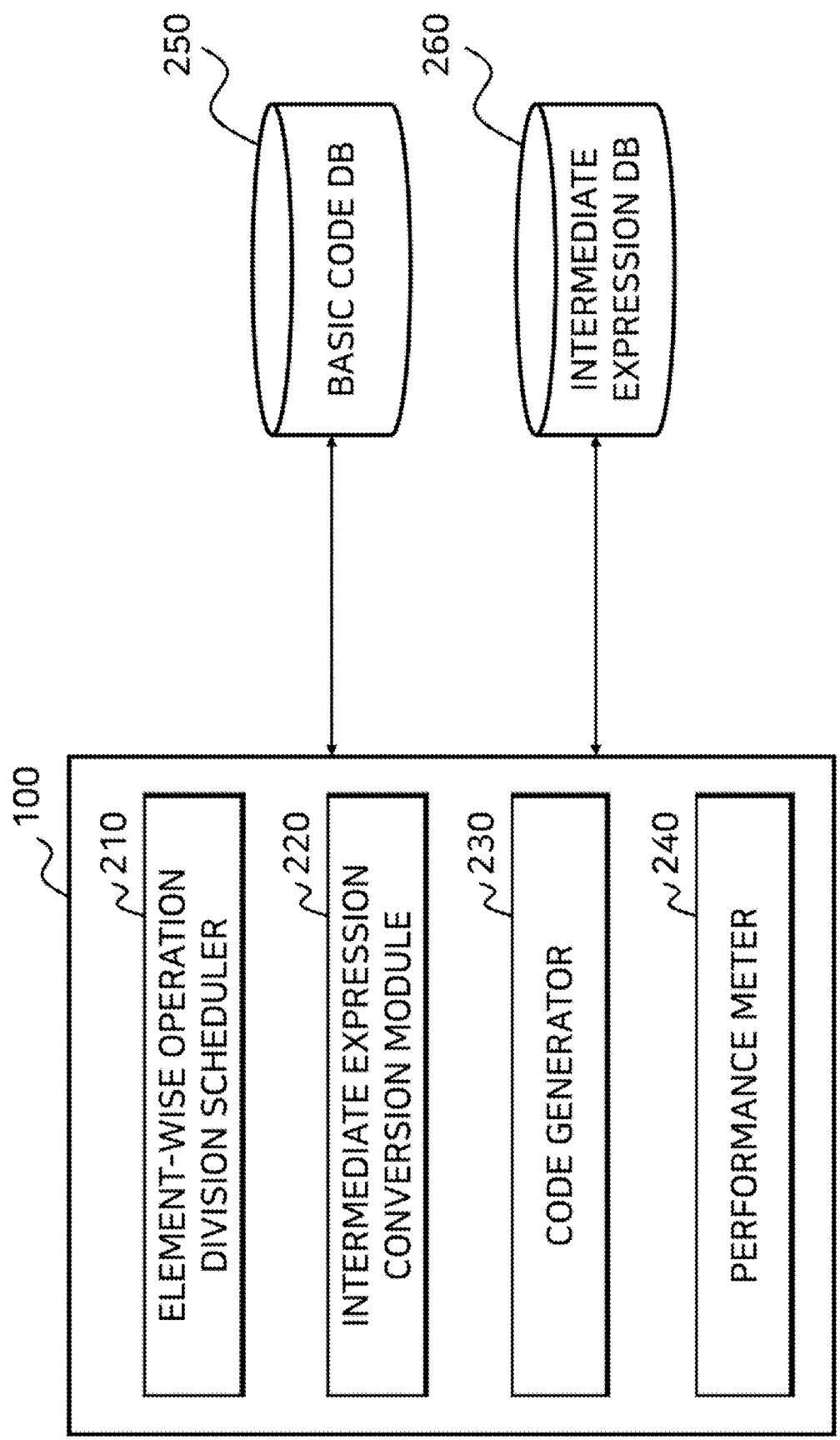
FIG. 2 is a block diagram of an internal configuration of a processor.

FIG. 2 is a block diagram of an internal configuration of the processor 100. As illustrated, the processor 100 may include an element-wise operation division scheduler 210, an intermediate expression conversion module 220, a code generator 230, a performance meter 240, and the like. In addition, the processor 100 may exchange information and/or data necessary for generating a program for use in an accelerator through communication with a basic code DB 250, an intermediate expression DB 260, and the like.

As described above, the processor 100 may receive a deep learning application. For example, the deep learning application may include a plurality of element-wise operations, an execution order of each element-wise operation, a dependency relationship of each element-wise operation, and the like. In another example, if the deep learning application includes only a plurality of element-wise operations, the processor 100 and/or the element-wise operation division scheduler 210 may analyze a pattern of a plurality of element-wise operations of the deep learning application to determine a data dependency relationship of a plurality of element-wise operations.

The element-wise operation division scheduler 210 may determine a schedule for grouping a plurality of element-wise operations based on the information included in the deep learning application. That is, the element-wise operation division scheduler 210 may determine a plurality of division schedules corresponding to the deep learning application based on the data dependency relationship of the plurality of element-wise operations. For example, if the deep learning application includes three element-wise operations such as A, B, and C, in which the operations A, B, and C are executed sequentially and there is a data dependency relationship between A and B and B and C, the element-wise operation division scheduler 210 may generate a total of four division schedules: (A, B, C), (A-B, C), (A, B-C), and (A-B-C).

The element-wise operation division scheduler 210 may generate all possible division schedules based on a plurality of element-wise operations, the execution order of each element-wise operation, the dependency relationship between each element-wise operation, and the like. Additionally or alternatively, the element-wise operation division scheduler 210 may not generate a division schedule previously recognized as having low performance among possible division schedules, or may exclude it from the generated division schedule. For example, it may be assumed that the deep learning application includes three element-wise operations such as A, B, and C, in which the A, B, and C are executed sequentially and there is a data dependency relationship between A and B and B and C. In this case, if it is confirmed that forming A and B as separate programs for use in the accelerator has better performance than forming A and B as one program, it is unlikely that improved performance is obtained by forming A-B-C as a single program. In this case, the search for program generation, performance measurement, and the like may not proceed because it is processed as an unnecessary division schedule.

The processor 100 and/or the element-wise operation division scheduler 210 may analyze the deep learning application to extract a plurality of element-wise operations included in the deep learning application, and generate an element-wise operation list including the extracted plurality of element-wise operations. In this case, the element-wise operation list may include a division schedule calculated by the element-wise operation division scheduler 210.

The processor 100 may transmit the generated element-wise operation list to the intermediate expression DB 260. The processor 100 may receive, from the intermediate expression DB 260, each of the element-wise operation intermediate expressions included in the element-wise operation list and/or the combination of the element-wise operation intermediate expressions according to the division schedule. In this case, the element-wise operation intermediate expression may be expressed in the form of a data flow graph including a node representing a scalar operation (e.g., floating-point multiplication, and the like) and an edge representing a dependency between the scalar operations.

The intermediate expression conversion module 220 may generate an intermediate expression by using a plurality of element-wise operation intermediate expressions received from the intermediate expression DB 260. That is, the intermediate expression conversion module 220 may generate the intermediate expression by concatenating the element-wise operation intermediate expressions based on the execution order and/or data dependency relationship of the element-wise operation associated with the deep learning application. The intermediate expression conversion module 220 may perform operation distribution among threads, thus determining which operation is to be processed by each thread. For example, the intermediate expression conversion module 220 may use a predetermined algorithm, and the like to perform operation distribution among threads such that the performance of the deep learning application can be enhanced.

The intermediate expression conversion module 220 may directly concatenate each of the element-wise operation intermediate expressions, or concatenate the element-wise operation intermediate expressions in such a manner that a result of one element-wise operation intermediate expression is stored in the shared memory and another element-wise operation intermediate expression reads the result stored in the shared memory. For example, when concatenating the element-wise operation intermediate expressions of A and B, the intermediate expression conversion module 220 may directly concatenate a node of A (a node corresponding to a scalar operation) and a node of B. In another example, the intermediate expression conversion module 220 may concatenate the element-wise operation intermediate expressions such that the result of the A element-wise operation intermediate expression is stored in the shared memory, and the B element-wise operation intermediate expression reads the stored result. The method for concatenating the element-wise operation intermediate expressions may be determined based on the performance of the program for use in the accelerator, and if the result of the A element-wise operation intermediate expression is stored in the shared memory, the optimization of the shared memory may be performed based on a predetermined algorithm, and the like.

The code generator 230 may generate a code for the program for use in the accelerator by using the intermediate expression generated by the intermediate expression conversion module 220. That is, the code generator 230 may generate a core operation code to perform an operation corresponding to the intermediate expression, based on the intermediate expression generated by concatenating and/or combining one or more element-wise operation intermediate expressions. Additionally, the code generator 230 may generate and/or extract basic code for executing the core operation code. Such a basic code may be a skeleton code determined based on hardware and a target programming language used in the deep learning application. That is, the code generator 230 may generate a program for use in the accelerator by using the generated core operation code and the basic code.

The code generator 230 acquires hardware and a target programming language used in the deep learning application, and extract a basic code corresponding to the acquired hardware and target programming language from the previously stored basic code DB 250. In this case, the code generator 230 may use the basic code extracted from the basic code DB 250 as it is, or may generate a new basic code by using the corresponding basic code. For example, the basic code may include a host program code for allocating memory and transferring data to execute a device function (e.g., a CUDA device function), a host program code for calling the kernel, a header code for the device function, a device function code (e.g., code related to obtaining a thread ID and index initialization) that is executed independently of the core operation, a code for reading data necessary for executing the core operation from the global memory, and the like.

The performance meter 240 may measure the performance of the program for use in the accelerator generated by the code generator 230. In this case, the performance meter 240 may measure the performance of the program for use in the accelerator by using performance indicators of execution time, energy consumption, and/or an amount of resource usage, but aspects are not limited thereto, and any performance index capable of measuring the performance of the deep learning application (or the program for use in the accelerator) may be used. In this case, the performance meter 240 may actually drives the program for use in the accelerator to measure the performance of the program for use in the accelerator, or may measure the performance of the program for use in the accelerator by using a predetermined algorithm to measure the performance of a deep learning application (or a program for use in the accelerator). For example, the performance meter 240 may measure the execution time between when test data is input to the generated program for use in the accelerator and when a result value corresponding to the test data is output. In this case, when the expected result is obtained within a short execution time, high performance may be determined.

The performance meter 240 may measure the respective performances of programs for use in the accelerator generated according to each of a plurality of division schedules. Accordingly, the processor 100 may compare the respective performances of the programs for use in the accelerator according to each of the plurality of division schedules, and select the program for use in the accelerator having the best performance. With such a configuration, for the deep learning application including any element-wise operation and/or combination of element-wise operations, the processor 100 may generate a program for use in the accelerator by combining the element-wise operations forming the deep learning application, and may generate and/or select a program for use in the accelerator having an optimal performance, based on the performance of each program for use in the accelerator according to the division schedule.

The basic code DB 250 and the intermediate expression DB 260 may refer to a database that is connected to the processor 100 or accessible through communication. FIG. 2 illustrates that the basic code DB 250 and the intermediate expression DB 260 are configured as separate databases, but aspects are not limited thereto, and these may be configured as a single database.

In addition, although the components of the processor 100 have been described separately for each function in FIG. 2, it does not necessarily mean that they are physically separated.

In FIG. 2, the element-wise operation division scheduler 210 and the intermediate expression conversion module 220 have been separately described above, but this is only to help the understanding of the disclosure, and two or more functions may be performed by one computing device. With such a configuration, the processor 100 can generate a program for use in the accelerator by combining one or more element-wise operations in real time and without the intervention of a programmer, such that it is possible to automate a series of processes for generating an optimal program for use in the accelerator. That is, it is possible to generate a code for the deep learning application or enhance the performance of the existing deep learning application without the need for additional human resources.

Figure 3:
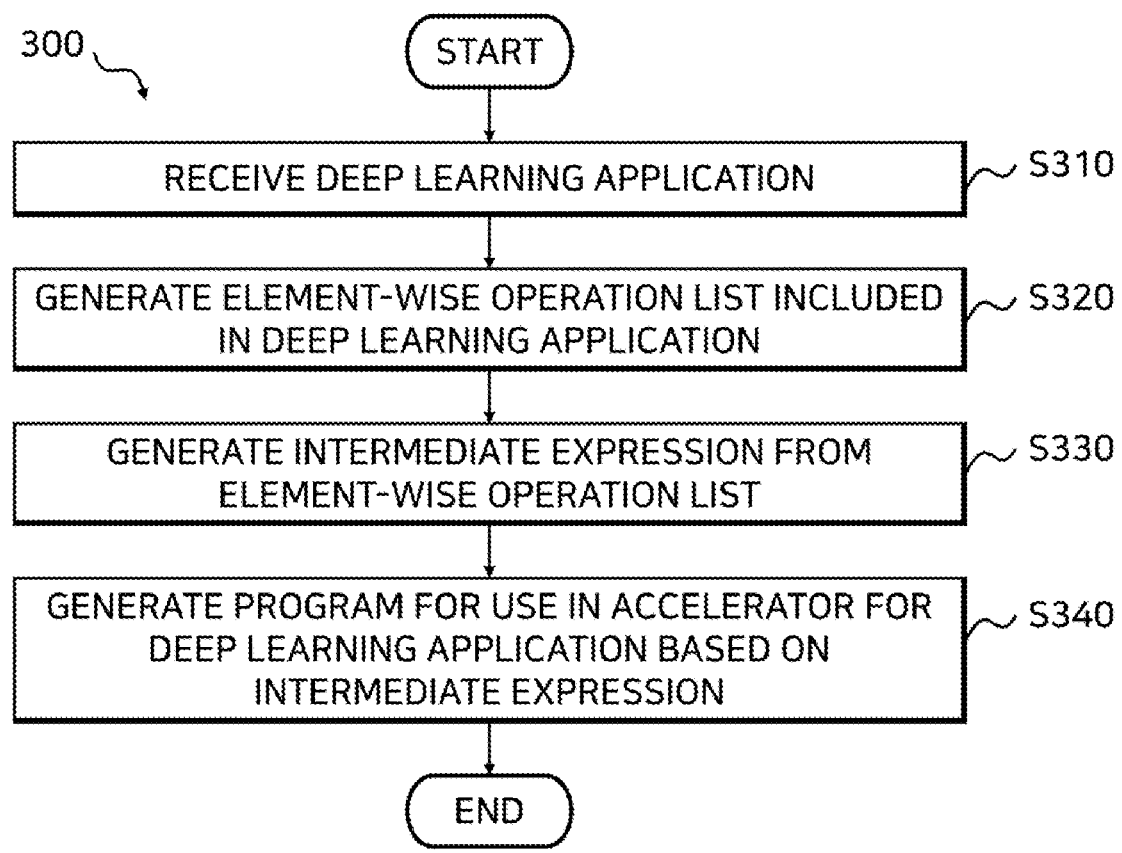
FIG. 3 is a flowchart illustrating an example of a method for generating a program for use in a deep learning-based accelerator.

FIG. 3 is a flowchart illustrating an example of a method 300 for generating a program for use in an accelerator for deep learning. The method 300 for generating a program for use in an accelerator for deep learning may be performed by at least one processor (e.g., the processor of FIG. 2). The method 300 for generating a program for use in an accelerator for deep learning may be initiated by the processor receiving a deep learning application (S310). In this example, the deep learning application may include one or more scalar operations and/or one or more element-wise operations.

The processor may generate an element-wise operation list included in the deep learning application (S320). In this case, the processor may extract a plurality of element-wise operations included in the deep learning application by analyzing, by the element-wise operation division scheduler, the deep learning application, and generate an element-wise operation list including the extracted plurality of element-wise operations.

The processor may generate an intermediate expression from the element-wise operation list (S330). For example, the processor may provide the element-wise operation list to the intermediate expression DB, and extract one or more element-wise operation intermediate expressions corresponding to the element-wise operation list from the intermediate expression DB. The intermediate expression may be generated by a concatenation of one or more extracted element-wise operation intermediate expressions.

The processor may generate a program for use in the accelerator for the deep learning application based on the intermediate expression (S340). In this example, the intermediate expression may be represented by a data flow graph including a plurality of nodes representing each scalar operation and an edge representing a dependency relationship between the scalar operations. In this case, the processor may search the graph of the intermediate expression by reverse postorder and generate a core operation code corresponding to the operation of each node. The processor may acquire hardware and a target programming language used in the deep learning application. In addition, the processor may extract a basic code corresponding to the acquired hardware and the target programming language from the previously stored basic code DB, and generate a program for use in the accelerator including the extracted basic code and the core operation code.

Figure 4:
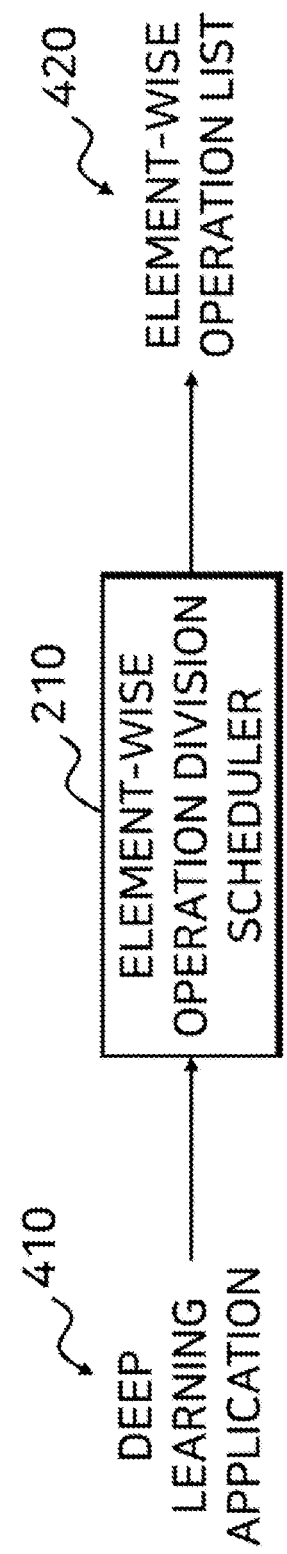
FIG. 4 is a diagram illustrating an example in which an element-wise operation division scheduler generates an element-wise operation list.

FIG. 4 is a diagram illustrating an example in which the element-wise operation division scheduler 210 generates an element-wise operation list 420. As illustrated, the element-wise operation division scheduler 210 may generate the element-wise operation list 420 by using the deep learning application 410. The deep learning application 410 may include one or more element-wise operations, and each element-wise operation may include one or more scalar operations. According to another example, the deep learning application 410 may include one or more element-wise operations, an execution order of each element-wise operation, a dependency relationship of each element-wise operation, and the like.

The element-wise operation division scheduler 210 may analyze the deep learning application 410 to extract a plurality of element-wise operations included in the deep learning application 410. In this case, the element-wise operation division scheduler 210 may analyze the pattern of the plurality of element-wise operations of the deep learning application 410 to determine the data dependency relationship of the plurality of element-wise operations. In addition, the element-wise operation division scheduler 210 may also analyze the pattern of the plurality of element-wise operations of the deep learning application 410 to determine the execution order of the plurality of element-wise operations.

The element-wise operation division scheduler 210 may generate the element-wise operation list 420 including the plurality of extracted element-wise operations. In this case, the element-wise operation division scheduler 210 may determine a plurality of division schedules corresponding to the deep learning application 410, based on the determined data dependency relationship of the plurality of element-wise operations and/or the execution order of the plurality of element-wise operations. The element-wise operation division scheduler 210 may generate the element-wise operation list 420 corresponding to each division schedule. That is, a plurality of element-wise operation lists 420 corresponding to one deep learning application 410 may be generated according to a plurality of division schedules.

Figure 5:
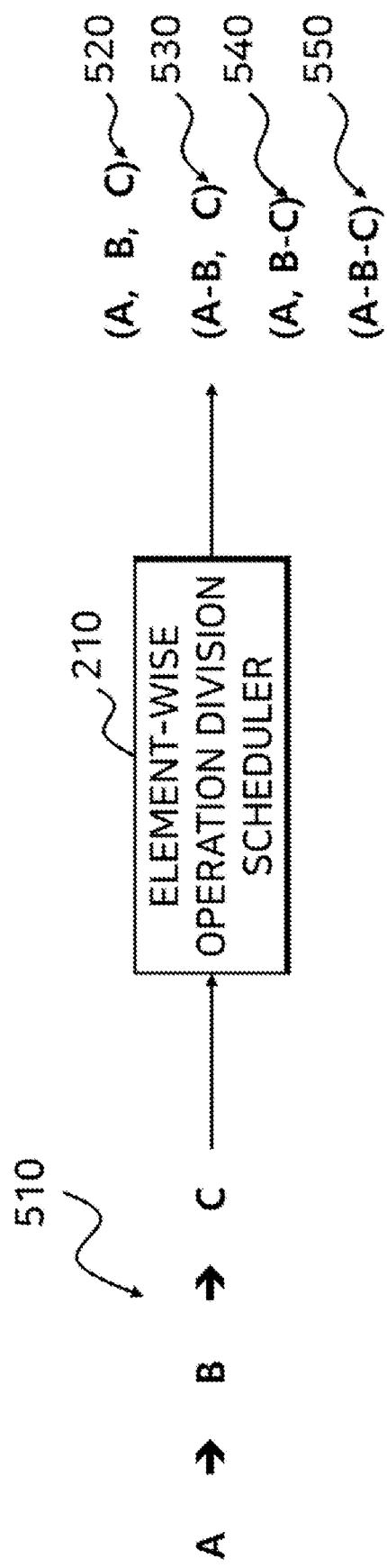
FIG. 5 is a diagram illustrating an example in which the element-wise operation division scheduler determines a plurality of division schedules.

FIG. 5 is a diagram illustrating an example in which the element-wise operation division scheduler 210 determines a plurality of division schedules 520, 530, 540, and 550. The plurality of element-wise operations 510 (e.g., A→B→C), which may be extracted from the deep learning application or determined by the element-wise operation division scheduler 210, may include the types of the element-wise operations, execution order, dependency relationship, and the like. In this case, the plurality of element-wise operations 510 may include A, B, and C element-wise operations, and have the execution order of A→B→C, and the data dependency relationship between A and B and B and C.

The element-wise operation division scheduler 210 may determine four division schedules 520, 530, 540, and 550 from the element-wise operation 510. For example, it may determine: a division schedule 520 for generating the A, B, and C element-wise operations into their respective intermediate expressions; a division schedule 530 for generating the A and B element-wise operations into one intermediate expression and generating the C element-wise operation into another intermediate expression; a division schedule 540 for generating the B and C element-wise operations into one intermediate expression and generating the A element-wise operation into another intermediate expression; and a division schedule 550 for generating each of the A, B, and C element-wise operations into one intermediate expression.

The element-wise operation division scheduler 210 may generate an element-wise operation list corresponding to each of the division schedules 520, 530, 540, and 550, and extract element-wise operation intermediate expressions corresponding to the generated element-wise operation list from the intermediate expression DB. For example, if the element-wise operation list corresponding to the division schedule 520 is generated, the element-wise operation division scheduler 210 may extract the element-wise operation intermediate expressions of each of A, B, and C from the intermediate expression DB. In another example, if the element-wise operation list corresponding to the division schedule 530 is generated, the element-wise operation division scheduler 210 may extract the element-wise operation intermediate expression of a combination of A and B and the element-wise operation intermediate expression of C from the intermediate expression DB, or may extract the element-wise operation intermediate expression of each of A, B and C.

Figure 6:
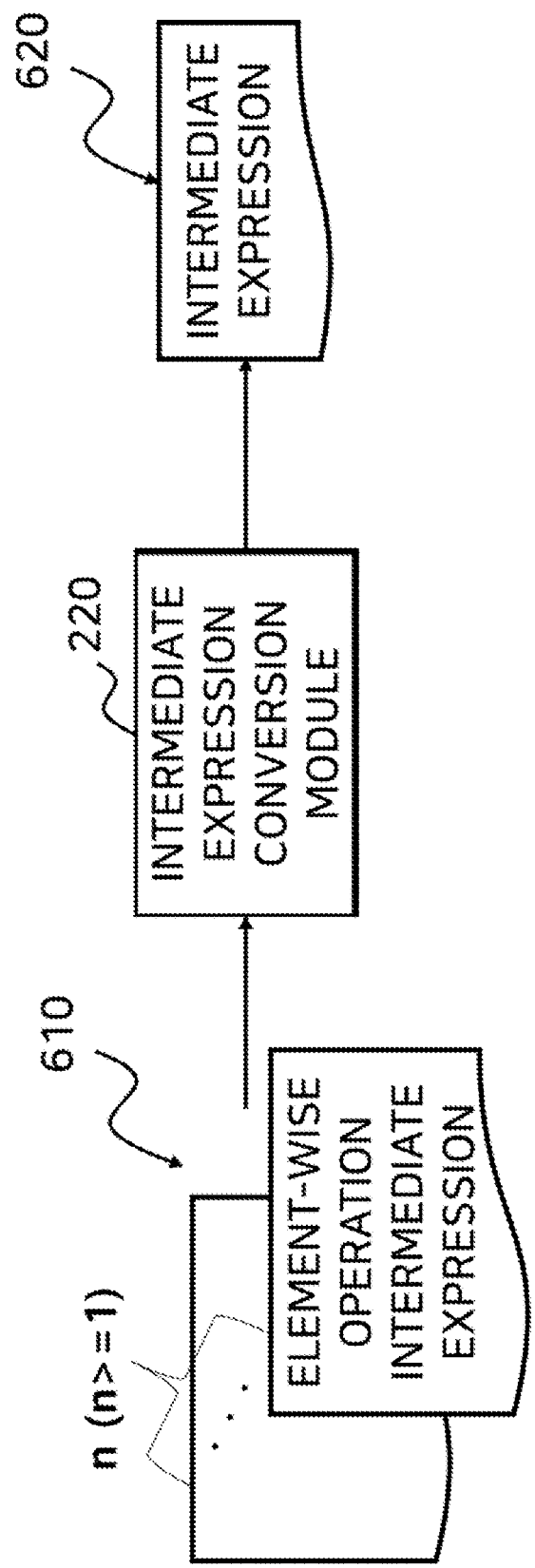
FIG. 6 is a diagram illustrating an example in which an intermediate expression conversion module generates an intermediate expression.

FIG. 6 is a diagram illustrating an example in which the intermediate expression conversion module 220 generates an intermediate expression 620. As described above, the processor and/or the element-wise operation division scheduler may extract the element-wise operation intermediate expression 610 corresponding to the element-wise operation list from the intermediate expression DB. In this case, the element-wise operation intermediate expression 610 may include n (n is a natural number) element-wise operation intermediate expressions extracted based on the element-wise operations included in the element-wise operation list, an execution order and a dependency relationship of the element-wise operations, and the like. The element-wise operation intermediate expression 610 extracted as described above may be provided to the intermediate expression conversion module 220.

The intermediate expression conversion module 220 may generate the intermediate expression 620 by using the element-wise operation intermediate expression 610. The intermediate expression conversion module 220 may generate one or more intermediate expressions 620 included in the selected one division schedule by concatenating a plurality of element-wise operation intermediate expressions 610 extracted based on one division schedule selected from among the plurality of division schedules. For example, if the element-wise operation intermediate expressions of each of A, B, and C are extracted based on the division schedule of A-B-C, the intermediate expression conversion module 220 may concatenate A, B, and C according to the execution order and/or the dependency relationship to generate one intermediate expression. For example, if the division schedule is (A-B, C), and A, B, and C are extracted as the element-wise operation intermediate expression 620, the intermediate expression conversion module 220 may perform concatenating A and B, which are the element-wise operation intermediate expressions.

The operations included in the intermediate expression 620 may be divided/distributed according to the determination as to which operation is to be processed by a plurality of threads respectively. For example, the intermediate expression conversion module 220 may use a predetermined algorithm, and the like to perform operation distribution among threads so that the performance of the deep learning application can be enhanced the most. In addition, if the result is stored in the shared memory after some operations included in the intermediate expression 620 are performed, the intermediate expression conversion module 220 may perform optimization of the shared memory based on a predetermined algorithm, and the like.

Figure 7:
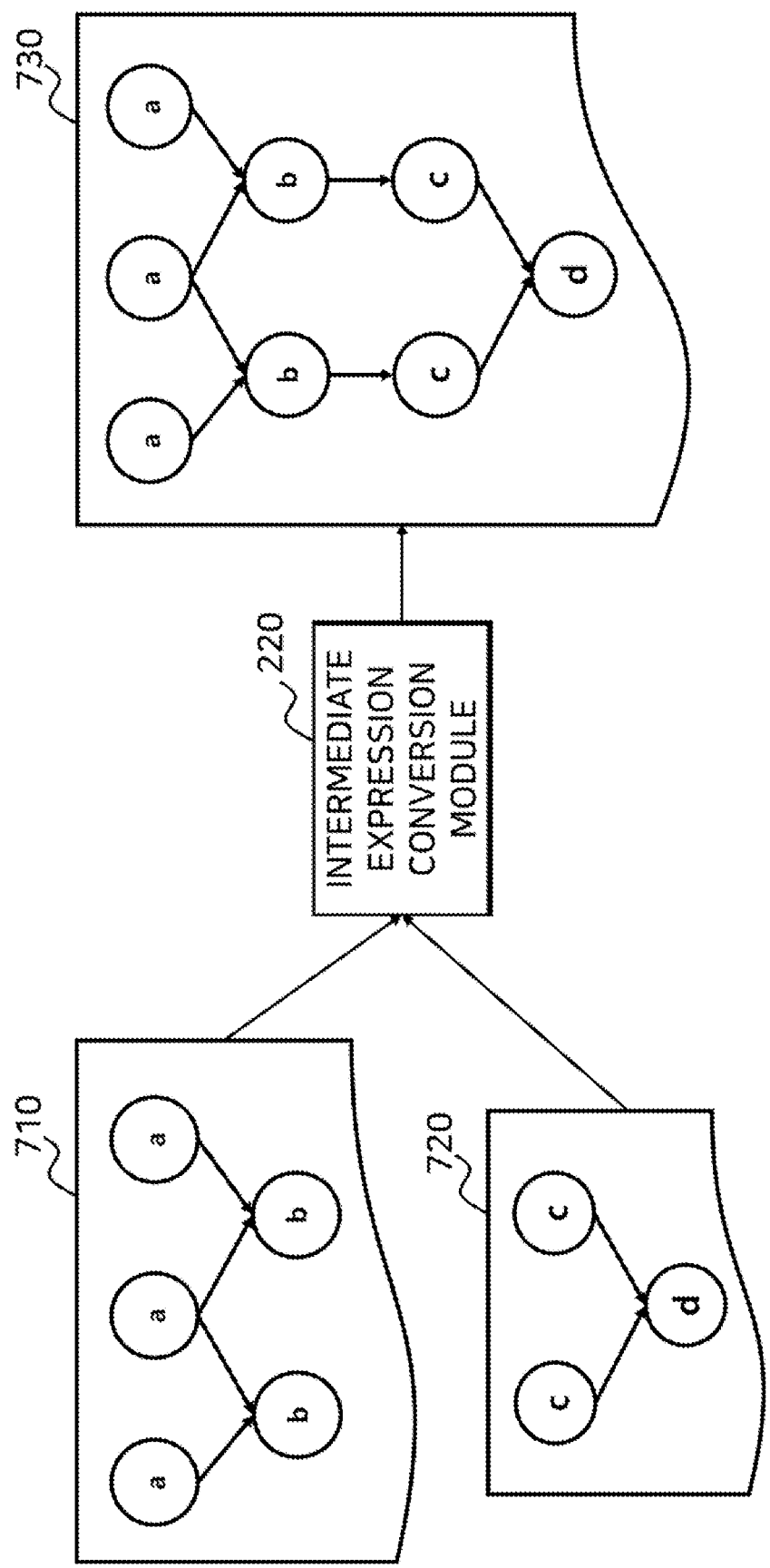
FIG. 7 is a diagram illustrating an example in which the intermediate expression conversion module concatenates element-wise operation intermediate expressions.

FIG. 7 is a diagram illustrating an example in which the intermediate expression conversion module 220 concatenates the element-wise operation intermediate expressions 710 and 720. For example, an element-wise operation intermediate expression 710 may include three "a" scalar operations and two "b" scalar operations, and the B element-wise operation intermediate expression 720 may include three "c" scalar operations and one "d" scalar operation. In this case, the scalar operation may refer to an addition operation, a subtraction operation, a maximum value operation, a minimum value operation, a floating-point multiplication operation, and the like, and the element-wise operation having one or more scalar operations as a set may refer to convolution, matrix multiplication, Rectified Linear Unit (ReLU), pooling, Long Short-Term Memory (LSTM), Gated Recurrent Unit (GRU), and the like used to generate a deep learning application.

The intermediate expression conversion module 220 may concatenate the element-wise operation intermediate expression 710 and the element-wise operation intermediate expression 720 to generate an intermediate expression 730. That is, the intermediate expression 730 may be a set of element-wise operation intermediate expressions 710 and 720 for generating one or more element-wise operations as one program for use in the accelerator. The intermediate expression conversion module 220 may concatenate the element-wise operation intermediate expression 710 and the element-wise operation intermediate expression 720 in consideration of the division schedule. In other words, the element-wise operation intermediate expression 710 and the element-wise operation intermediate expression 720 may be concatenated based on the execution order, dependency relationship, and the like of the element-wise operation intermediate expression 710 and the element-wise operation intermediate expression 720.

In the illustrated example, the element-wise operation intermediate expression 710 may be executed first, and the element-wise operation intermediate expression 720 may be executed. In addition, the result value of the "b" scalar operation of the element-wise operation intermediate expression 710 may be used as an input to the "c" scalar operation of the element-wise operation intermediate expression 720. In this case, the intermediate expression conversion module 220 may directly concatenate the "b" scalar operation of the element-wise operation intermediate expression 710 and the "c" scalar operation of the element-wise operation intermediate expression 720 to generate the intermediate expression 730.

FIG. 7 illustrates that the intermediate expression conversion module 220 directly concatenates the scalar operations of the element-wise operation intermediate expression 710 and the scalar operations of the element-wise operation intermediate expression 720 to generate the intermediate expression 730, but aspects are not limited thereto. For example, the intermediate expression conversion module 220 may store the execution result of the element-wise operation intermediate expression 710 in the shared memory in consideration of the optimization of the shared memory and/or distribution of operations among threads, and the like, where the element-wise operation intermediate expression 710 may be generated as a separate intermediate expression. In addition, the intermediate expression conversion module 220 may generate the element-wise operation intermediate expression 720 as a separate intermediate expression such that the element-wise operation intermediate expression 720 reads the execution result of the element-wise operation intermediate expression 710 stored in the shared memory. With such a configuration, the intermediate expression conversion module 220 may appropriately concatenate one or more element-wise operation intermediate expressions according to the division schedule to generate an optimal intermediate expression.

Figure 8:
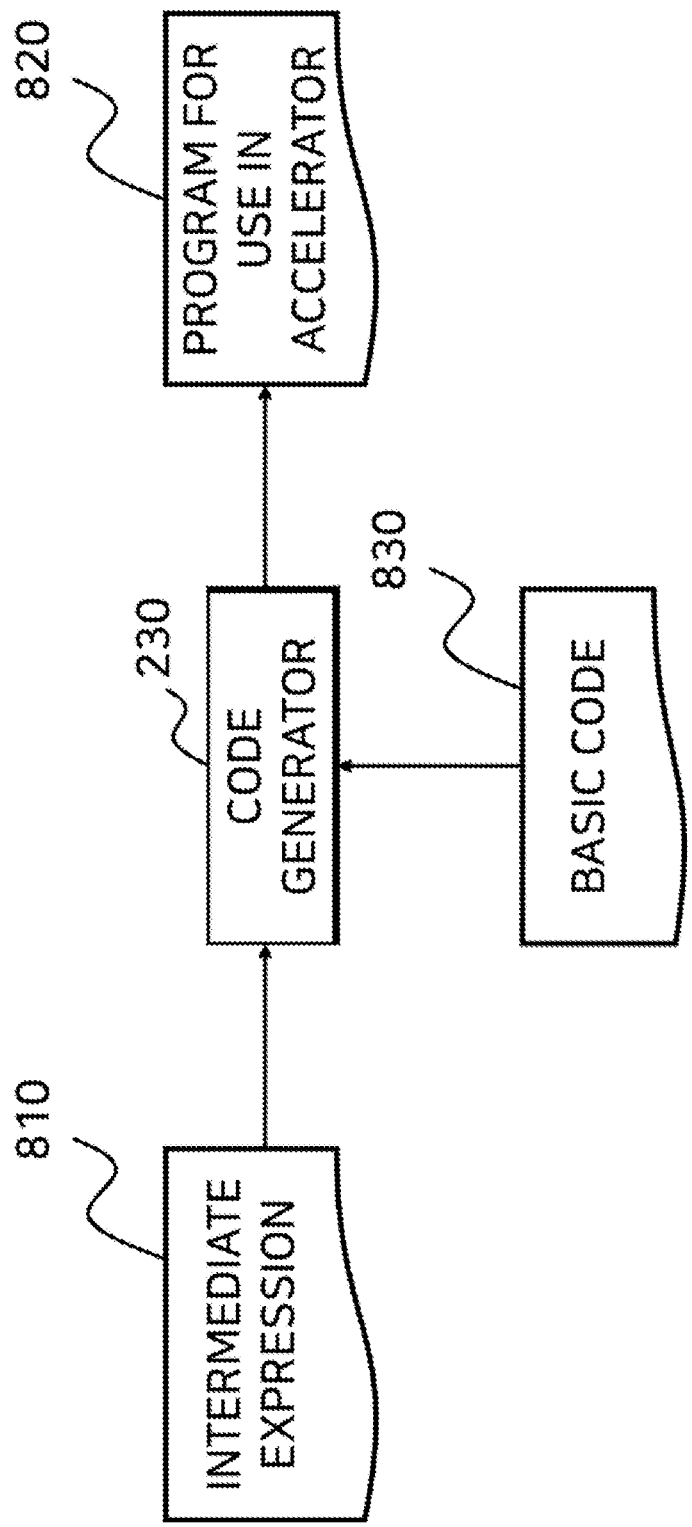
FIG. 8 is a diagram illustrating an example in which a code generator generates a program for use in an accelerator.

FIG. 8 is a diagram illustrating an example in which the code generator 230 generates a program 820 for use in an accelerator. As described above, the code generator 230 may use an intermediate expression 810 and a basic code 830 to generate the program 820 for use in the accelerator. In this example, the intermediate expression 810 may be represented by a data flow graph including a plurality of nodes each representing a scalar operation and an edge representing a dependency relationship between the scalar operations.

The code generator 230 may generate the program 820 for use in the accelerator for a deep learning application based on the intermediate expression 810. In this case, the code generator 230 may search the graph of the intermediate expression 810 by reverse postorder to generate a core operation code corresponding to the operation of each node, although aspects are not limited thereto. In this case, the core operation code may be a code part for executing an operation corresponding to the intermediate expression 810 in the kernel of the program for use in the accelerator 820.

The code generator 230 may generate a program 820 for use in the accelerator for a deep learning application based on the intermediate expression 810 and the basic code 830. The code generator 230 may acquire hardware and a target programming language used in the deep learning application. It may be possible to extract the basic code 830 corresponding to the acquired hardware and target programming language from a previously stored basic code DB. In this case, the basic code 830 may include any code for generating a program for use in the accelerator other than the core code operation part, including, for example, a host program code for allocating memory and transferring data to execute a device function (e.g., a CUDA device function), a host program code for calling the kernel, a header code for the device function, a device function code (e.g., a code related to obtaining a thread ID and index initialization) that is executed independently of the core operation, and/or a code for reading data necessary for executing the core operation from the global memory, and the like.

FIG. 8 illustrates that one program 820 for use in the accelerator is generated based on one intermediate expression 810, but aspects are not limited thereto. For example, the code generator 230 may generate a plurality of programs 820 for use in the accelerator corresponding to each of one or more intermediate expressions 810 included in a plurality of division schedules. With such a configuration, the code generator 230 may generate the code corresponding to the intermediate expression 810 to generate the program for use in the accelerator 820 in real time.

Figure 9:
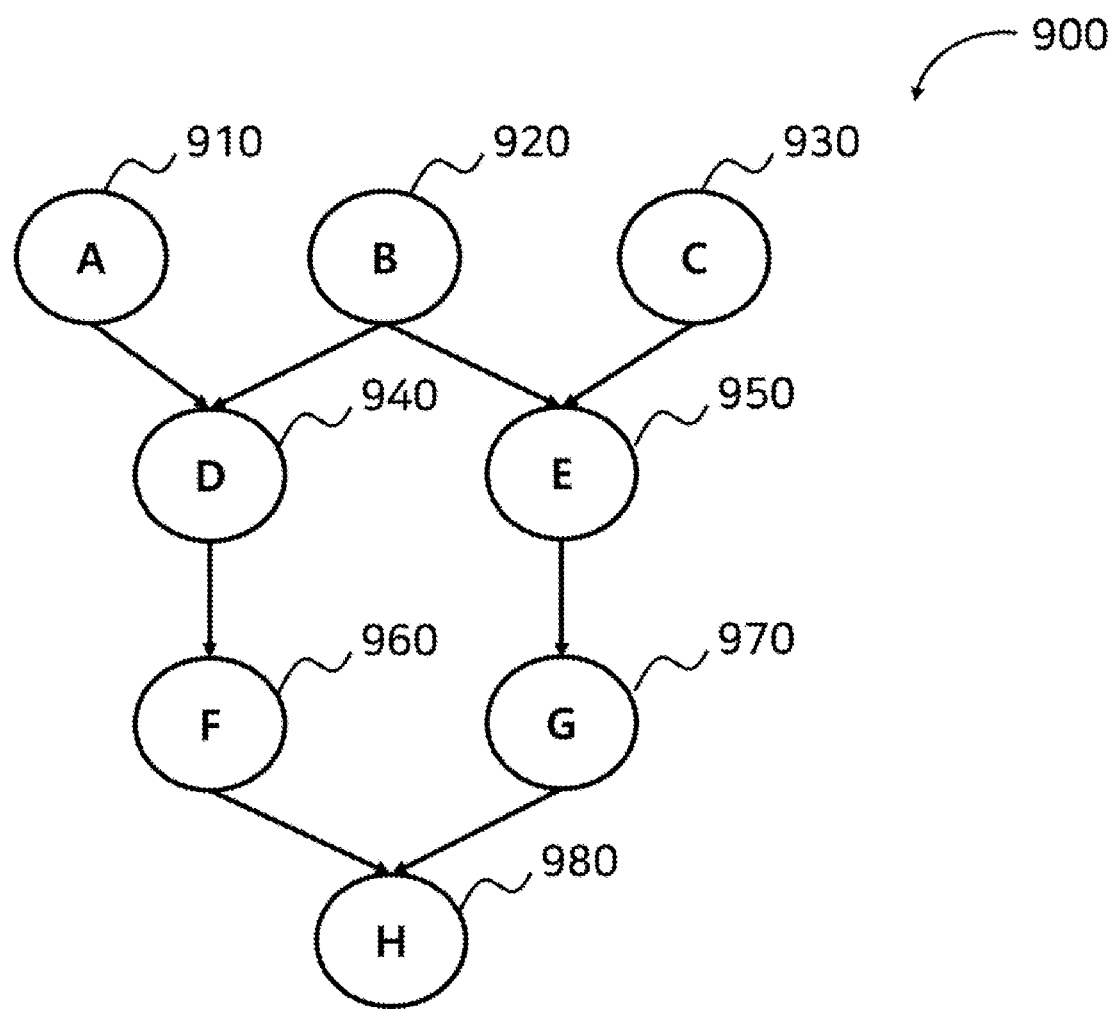
FIG. 9 is an exemplary diagram illustrating a data flow graph of an intermediate expression.

FIG. 9 is an exemplary diagram illustrating a data flow graph 900 of an intermediate expression. The data flow graph 900 of the intermediate expression may be generated by concatenating element-wise operation intermediate expressions (e.g., data flow graphs of the element-wise operation intermediate expression). Each node of the graph 900 may represent a scalar operation forming an intermediate expression, and each edge concatenating the nodes may represent a dependency relationship between the scalar operations.

The processor and/or code generator described above may searching the graph 900 by reverse postorder to generate a core operation code corresponding to an operation of each node. In this example, reverse postorder is a method for searching each node in a graph of an inverse tree structure, and may be a method for searching each subtree in order.

In the data flow graph 900 of the intermediate expression, the code generator may start searching from a node A 910 in the upper left position. That is, the code generator may generate the code of the node A 910. The code generator may generate a code of a node B 920 necessary to generate a node D 940 which is a child node of the node A 910 and generate a code of the node D 940. In addition, the code generator may generate a code of a node F 960 which is a child node of the node D 940. The code generator may generate a code of a node C 930, generate a code of a node E 950, and generate a code of a node G 970 by reverse postorder. After both the code of the node F 960 and the code of the node G 970 are generated, finally, a code of a node H 980 may be generated. In other words, the node A 910, the node B 920, the node D 940, the node F 960, the node C 930, the node E 950, the node G 970, and the node H 980 are searched in order, and the core operation codes may be generated in that order.

In the present disclosure, each node may be searched by reverse postorder according to an edge linking each node (an edge corresponding to the dependency relationship of each scalar operation), and the codes may be generated based on the searched order. For example, the codes described above may be generated line-by-line, or may be generated in a single static assignment (SSA) format. In addition, a new variable may be generated for every line of code, and each code may be generated such that variable names do not overlap.

Figure 10:
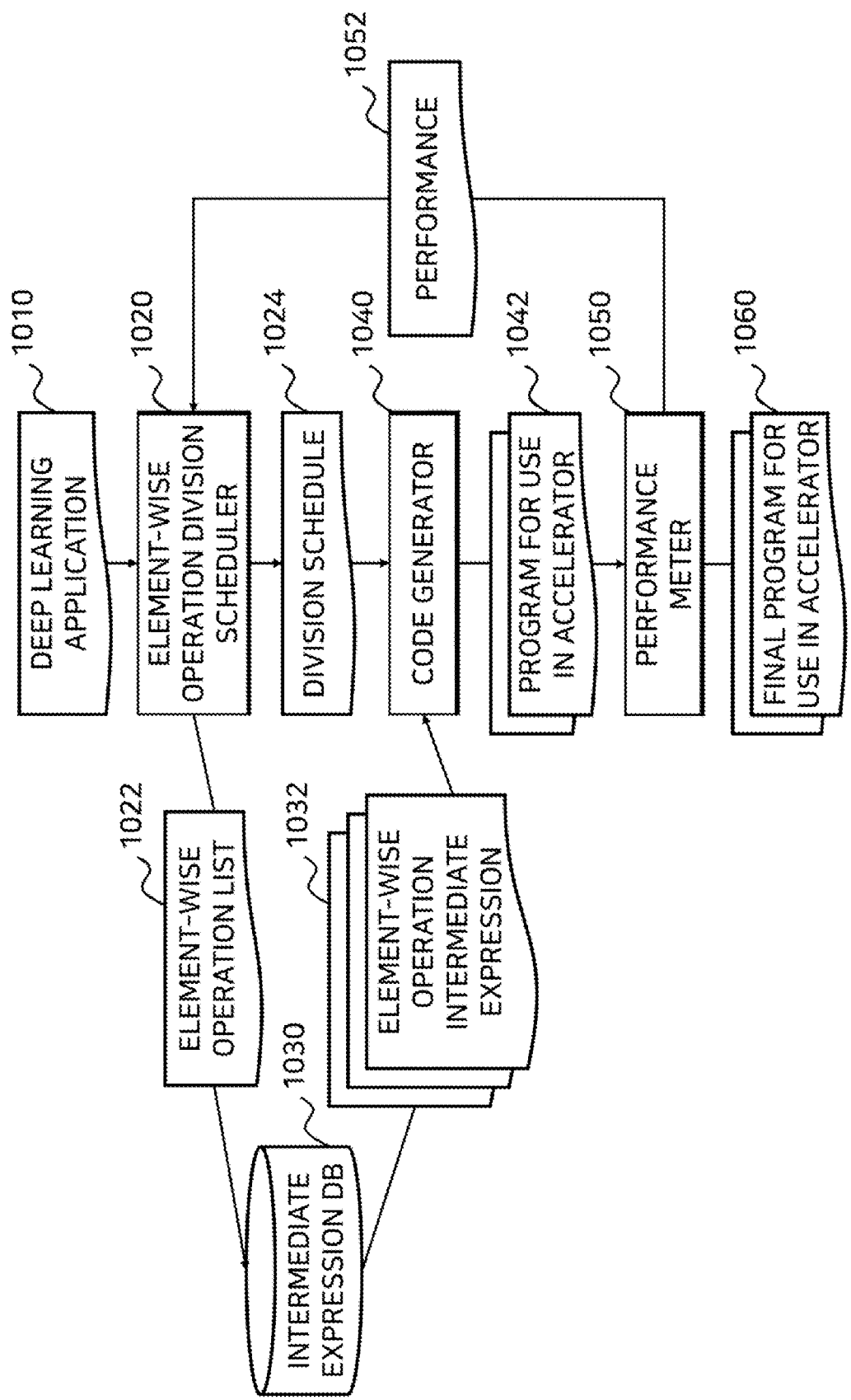
FIG. 10 is a block diagram of an example of generating a final program for use in an accelerator.

FIG. 10 is a block diagram of an example of generating a final program 1060 for use in an accelerator. As illustrated, an element-wise operation division scheduler 1020 may receive a deep learning application 1010. For example, the deep learning application 1010 may be a combination of conceptual element-wise operations generated using a deep learning framework.

The element-wise operation division scheduler 1020 may generate an element-wise operation list 1022 included in the deep learning application 1010. Specifically, the element-wise operation division scheduler 1020 may analyze the deep learning application 1010 to extract a plurality of element-wise operations included in the deep learning application 1010, and generate an element-wise operation list 1022 including the extracted plurality of element-wise operations. In addition, the element-wise operation division scheduler 1020 may analyze a pattern of a plurality of element-wise operations of the deep learning application 1010 to determine the data dependency relationship between the plurality of element-wise operations, and determine a plurality of division schedules corresponding to the deep learning application 1010 based on the determined data dependency relationship of the plurality of element-wise operations. In this case, the element-wise operation division scheduler 1020 may select one division schedule 1024 from among a plurality of division schedules.

A plurality of element-wise operation intermediate expressions 1032 corresponding to the element-wise operation list 1022 may be extracted from an intermediate expression DB 1030 based on the selected one division schedule 1024. In this case, each of the plurality of element-wise operation intermediate expressions 1032 may represent a data flow graph for the operation of one thread block. A plurality of element-wise operation intermediate expressions 1032 are concatenated based on the selected one division schedule 1024 to generate one or more intermediate expressions.

The code generator 1040 may generate a program 1042 for use in the accelerator corresponding to each of the one or more intermediate expressions generated based on the selected division schedule 1024. In this example, the intermediate expression may include a graph including a plurality of nodes representing each scalar operation and edges representing the dependency relationship between the scalar operations. For example, the code generator 1040 may search the graph of the intermediate expression by reverse postorder to generate a core operation code corresponding to the operation of each node.

In addition, the code generator 1040 may acquire hardware and a target programming language used in the deep learning application. For example, the hardware may refer to a multi-core CPU, GPU, FPGA, and the like used for deep learning, but is not limited thereto. In addition, the target programming language may refer to a programming language for generating a GPU program, an FPGA program, and the like by using a multi-core CPU, GPU, FPGA, or the like. For example, the GPU program may include a kernel function (or a device function), a host function for calling it, and the like. In another example, the FPGA program may include a bitstream, a host function for synthesizing and executing it with FPGA hardware, and the like. As another example, the code generator 1040 may extract the basic code corresponding to the acquired hardware and target programming language from a previously stored basic code DB. The code generator 1040 may generate a program 1042 for use in the accelerator including the basic code and the generated core operation codes.

The performance meter 1050 may determine a performance 1052 of the generated program 1042 for use in the accelerator. In addition, the performance meter 1050 may provide the determined performance 1052 of the program 1042 for use in the accelerator to the element-wise operation division scheduler 1020. The element-wise operation division scheduler 1020 may select one division schedule other than the previously selected division schedule from among a plurality of division schedules based on the determined performance 1052 of the program 1042 for use in the accelerator. An element-wise operation list according to this selected division schedule may be provided, an element-wise operation intermediate expression may be extracted, an intermediate expression may be generated, and another program for use in the accelerator may be generated.

By repeating this processes, the code generator 1040 may generate a plurality of programs for use in the accelerator corresponding to the plurality of determined division schedules. In this case, the performance meter 1050 may determine the performance of each of the plurality of programs for use in the accelerator. The performance meter 1050 may select one program 1060 for use in the accelerator from among the plurality of generated programs for use in the accelerator based on the determined performances.

In FIG. 10, the element-wise operation division scheduler 1020, the code generator 1040, the performance meter 1050 and the like have been described separately for each function, but this does not necessarily mean that they are physically separated. For example, the code generator 1040 and the performance meter 1050 have been separately described above, but this is only to help the understanding of the disclosure, and two or more functions may be performed by one computing device. In addition, in FIG. 10, the element-wise operation division scheduler 1020, the code generator 1040, the performance meter 1050, and the like have been described above as being used for determining the final program 1060 for use in the accelerator, but aspects are not limited thereto, and an intermediate expression conversion module and the like may be further included to determine the final program 1060 for use in the accelerator. With such a configuration, the final program for use in the accelerator with the best performance among the programs for use in the accelerator according to the division schedules may be generated, and the generated final program for use in the accelerator may be used to drive the deep learning application.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EE- PROM), flash memory, compact disc (CD), magnetic or optical data storage devices, and the like. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, the present disclosure is not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for generating a program for use in an accelerator for deep learning, the method comprising:
   receiving, by a computing device, a deep learning application;
   generating, based on the deep learning application, an element-wise operation list comprising a plurality of element-wise operations extracted from the deep learning application;
   determining, based on a division schedule associated with the element-wise operation list, a plurality of element-wise operation intermediate expressions, wherein each of the plurality of element-wise operation intermediate expressions represents a data flow graph for an operation of a thread block;
   generating, based on a concatenation of the plurality of element-wise operation intermediate expressions, an intermediate expression; and
   generating, based on the intermediate expression, a program for use in an accelerator for the deep learning application.

2. The method according to claim 1, further comprising:
   extracting the plurality of element-wise operations included in the deep learning application by analyzing, by an element-wise operation division scheduler, the deep learning application,
   wherein the element-wise operation list comprises an element-wise operation list including the extracted plurality of element-wise operations.

3. The method according to claim 2, further comprising:
   determining, by analyzing a pattern of the extracted plurality of element-wise operations, a data dependency relationship of the extracted plurality of element-wise operations; and
   determining, based on the determined data dependency relationship of the plurality of element-wise operations, a plurality of division schedules corresponding to the deep learning application.

4. The method according to claim 1, further comprising selecting, via an element-wise operation division scheduler, the division schedule from among a plurality of division schedules associated with the element-wise operation list,
   wherein the determining the plurality of element-wise operation intermediate expressions comprises: extracting, based on the division schedule, the plurality of element-wise operation intermediate expressions from an intermediate expression database (DB), and
   wherein the generating the element-wise operation list is performed before generating a data flow graph associated with the deep learning application.

5. The method according to claim 4, wherein the generated intermediate expression comprises one or more intermediate expressions generated by concatenating the plurality of element-wise operation intermediate expressions, and
   wherein the generating the program for use in the accelerator for the deep learning application comprises generating a program for use in the accelerator corresponding to each of the one or more intermediate expressions.

6. The method according to claim 4, further comprising:
   determining a performance of the generated program for use in the accelerator;
   providing the determined performance of the program for use in the accelerator to the element-wise operation division scheduler; and
   selecting, by the element-wise operation division scheduler and based on the determined performance of the program for use in the accelerator, a division schedule other than the selected division schedule from among the plurality of division schedules.

7. The method according to claim 3, further comprising:
   generating a plurality of programs for use in the accelerator corresponding to the determined plurality of division schedules; and
   determining a performance of each of the plurality of programs for use in the accelerator,
   wherein the generating the program for use in the accelerator for the deep learning application comprises selecting, based on the determined performance, a program for use in the accelerator from among the generated plurality of programs for use in the accelerator.

8. The method according to claim 1, wherein the intermediate expression is represented by a graph including a plurality of nodes representing scalar operations respectively, and edges representing a dependency relationship between the scalar operations, and
   the generating the program for use in the accelerator for the deep learning application comprises searching a graph of the intermediate expression by reverse postorder to generate a core operation code corresponding to an operation of each node.

9. The method according to claim 8, wherein the generating the program for use in the accelerator for the deep learning application comprises:
   acquiring hardware and a target programming language used in the deep learning application;
   extracting a basic code corresponding to the acquired hardware and target programming language from a previously stored basic code database (DB); and
   generating a program for use in the accelerator including the extracted basic code and the core operation code.

10. A non-transitory computer-readable recording medium storing instructions that, when executed by one or more processors, cause:
    receiving, by a computing device, a deep learning application;
    selecting, via an element-wise operation division scheduler, a division schedule from among a plurality of division schedules;

generating an element-wise operation list of the deep learning application;
generating an intermediate expression from the element-wise operation list by:
extracting, based on the selected division schedule, a plurality of element-wise operation intermediate expressions corresponding to the element-wise operation list from an intermediate expression database (DB), wherein each of the plurality of element-wise operation intermediate expressions represents a data flow graph for an operation of a thread block; and
generating, based on the selected division schedule, one or more intermediate expressions by concatenating the extracted plurality of element-wise operation intermediate expressions; and
generating, based on the intermediate expression, a program for use in an accelerator for the deep learning application.

11. The non-transitory computer-readable recording medium according to claim 10, wherein the instructions, when executed by one or more processors, further cause:
extracting a plurality of element-wise operations included in the deep learning application by analyzing, via the element-wise operation division scheduler, the deep learning application,
wherein the element-wise operation list of the deep learning application comprises an element-wise operation list including the extracted plurality of element-wise operations.

12. The non-transitory computer-readable recording medium according to claim 11, wherein the instructions, when executed by one or more processors, further cause:
determining, by analyzing a pattern of the extracted plurality of element-wise operations, a data dependency relationship of the extracted plurality of element-wise operations; and
determining, based on the determined data dependency relationship of the plurality of element-wise operations, a plurality of division schedules corresponding to the deep learning application.

13. The non-transitory computer-readable recording medium according to claim 10, wherein the instructions, when executed by one or more processors, cause the generating the program for use in the accelerator for the deep learning application by generating a program for use in the accelerator corresponding to each of the one or more intermediate expressions generated based on the selected division schedule.

14. The non-transitory computer-readable recording medium according to claim 10, wherein the instructions, when executed by one or more processors, further cause:
determining a performance of the generated program for use in the accelerator;
providing the determined performance of the program for use in the accelerator to the element-wise operation division scheduler; and
selecting, via the element-wise operation division scheduler and based on the determined performance of the program for use in the accelerator, a division schedule other than the selected division schedule from among the plurality of division schedules.

15. The non-transitory computer-readable recording medium according to claim 12, wherein the instructions, when executed by one or more processors, further cause:
generating a plurality of programs for use in the accelerator corresponding to the determined plurality of division schedules; and
determining a performance of each of the plurality of programs for use in the accelerator, and
wherein the instructions, when executed by one or more processors, cause the generating the program for use in the accelerator for the deep learning application by selecting, based on the determined performance, a program for use in the accelerator from among the generated plurality of programs for use in the accelerator.

16. The non-transitory computer-readable recording medium according to claim 10, wherein the intermediate expression is represented by a graph including a plurality of nodes representing scalar operations respectively, and edges representing a dependency relationship between the scalar operations, and
wherein the instructions, when executed by one or more processors, cause the generating the program for use in the accelerator for the deep learning application by searching a graph of the intermediate expression by reverse postorder to generate a core operation code corresponding to an operation of each node.

17. The non-transitory computer-readable recording medium according to claim 16, wherein the instructions, when executed by one or more processors, cause the generating the program for use in the accelerator for the deep learning application by:
acquiring hardware and a target programming language used in the deep learning application;
extracting a basic code corresponding to the acquired hardware and target programming language from a previously stored basic code database (DB); and
generating a program for use in the accelerator including the extracted basic code and the core operation code.

18. A method for generating a program for use in an accelerator for deep learning, the method comprising:
receiving, by a computing device, a deep learning application;
before generating a data flow graph associated with the deep learning application:
determining a plurality of element-wise operations of the deep learning application; and
generating, based on a division schedule of a plurality of division schedules, an element-wise operation list comprising the plurality of element-wise operations;
generating, based on the element-wise operation list, an intermediate expression comprising at least one data flow graph; and
generating, based on the intermediate expression, a program for use in an accelerator for the deep learning application.

19. The method according to claim 18, further comprising:
selecting, via an element-wise operation division scheduler, the division schedule from among the plurality of division schedules; and
determining, based on the selected division schedule, a plurality of element-wise operation intermediate expressions, wherein each of the plurality of element-wise operation intermediate expressions represents a data flow graph for an operation of a thread block,
wherein the generating the intermediate expression comprises:

generating, based on a concatenation of the plurality of element-wise operation intermediate expressions, one or more intermediate expressions.

20. The method according to claim 18, further comprising:
selecting, based on a performance of the program for use in the accelerator, a second division schedule from among the plurality of division schedules.

* * * * *